(12) United States Patent
Huang et al.

(10) Patent No.: US 6,259,667 B1
(45) Date of Patent: Jul. 10, 2001

(54) OPTICAL DISK LOADER

(75) Inventors: An-Ying Huang, Tainan Hsien; Chau-Yuan Ke, Pintung Hsien, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/299,958

(22) Filed: Apr. 26, 1999

(30) Foreign Application Priority Data

Apr. 3, 1999 (TW) ................................. 88105361

(51) Int. Cl.[7] ................................. G11B 33/02
(52) U.S. Cl. ................................. 369/77.1
(58) Field of Search ................... 369/34, 36, 38, 369/75.1, 75.2, 77.1, 77.2, 191, 192, 178; 360/99.02, 99.06, 92

(56) References Cited

U.S. PATENT DOCUMENTS 5,805,561 * 9/1998 Pollard ................................. 369/36
5,926,341 * 7/1999 Mueller et al. ................... 369/36

* cited by examiner

Primary Examiner—Allen T. Cao
(74) Attorney, Agent, or Firm—Jiawei Huang; J.C. Patents

(57) ABSTRACT

A disk loader for loading disk into a disk reader having a vertical protection panel and a retractable block structure. The vertical protection panel is used for restricting bare disk so that even if the disk reader is vertically placed, the disk cannot fall out during the disk-loading process. The retractable block structure is used for pushing one side of a disk cartridge so that even if the disk reader is vertically placed, the disk cartridge cannot fall out during the disk-loading process. Therefore, the disk reader can be horizontally placed or vertically placed without affecting the process of loading a bare disk or a disk cartridge into a disk reader. In addition, the disk loader can be designed to use a set of pre-loading arms for restricting a bare disk or disk cartridge, too.

29 Claims, 15 Drawing Sheets

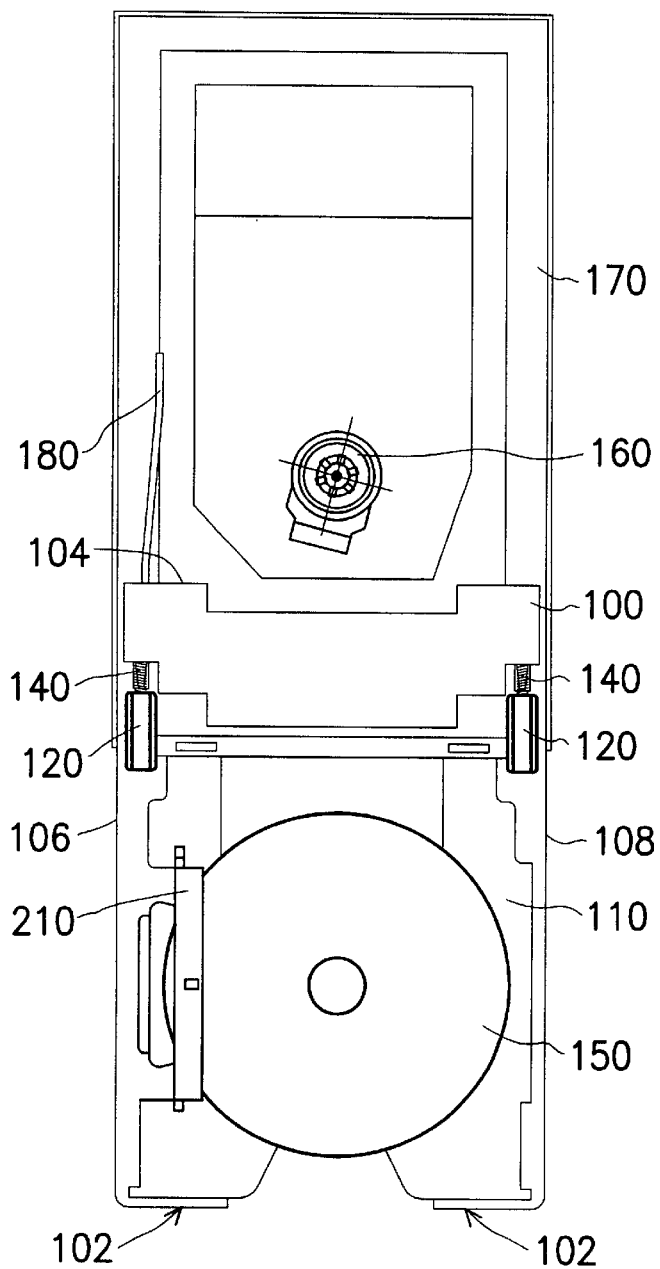
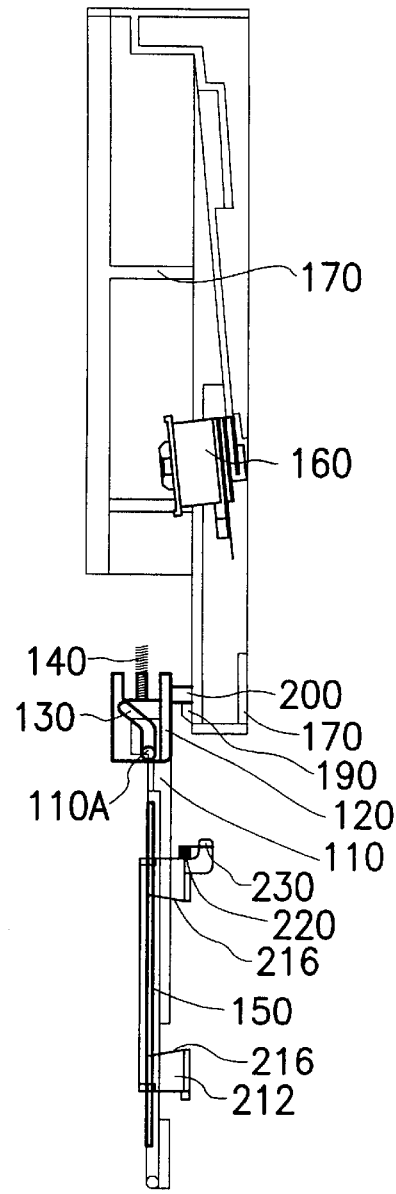
FIG. 7A  FIG. 7B
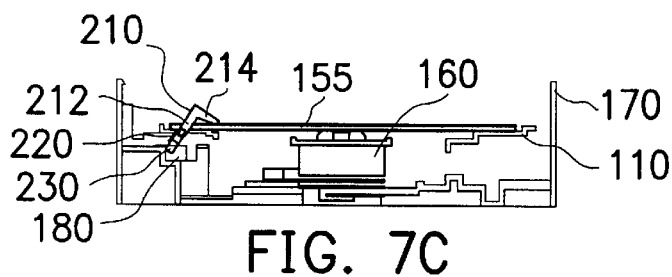
FIG. 7C

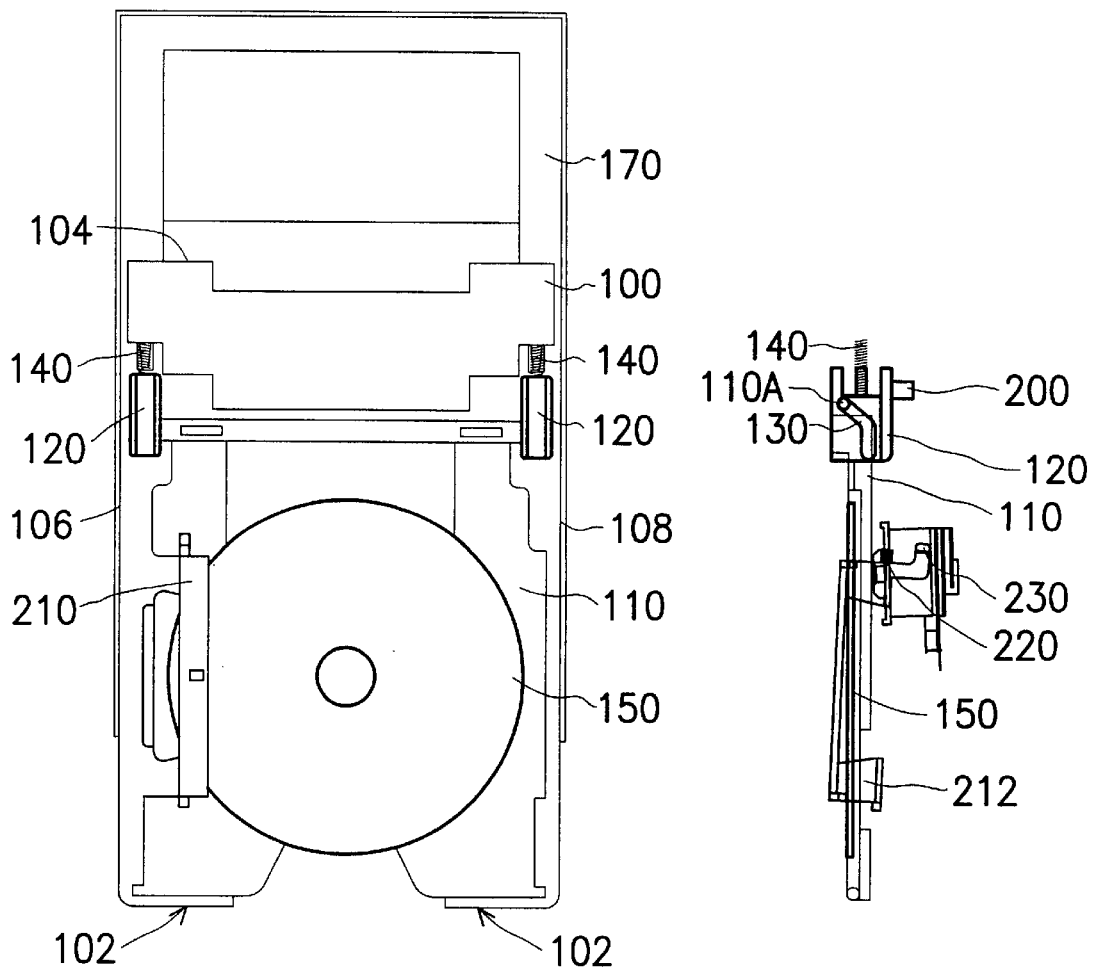
FIG. 8A
FIG. 8B
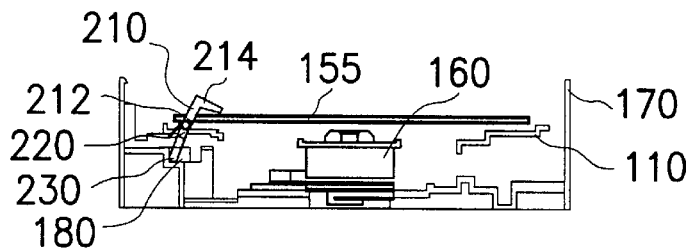
FIG. 8C

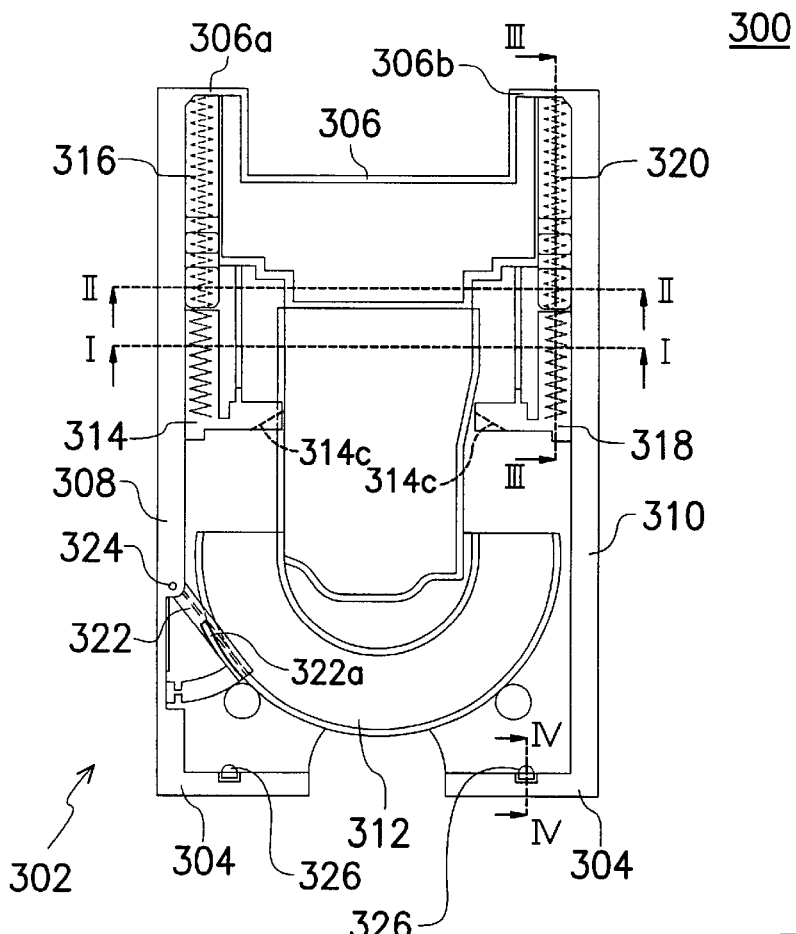
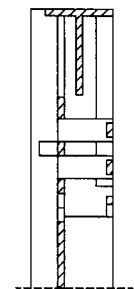
FIG. 10D
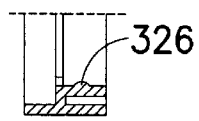
FIG. 10E
FIG. 10A
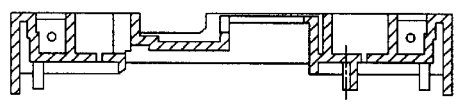
FIG. 10B
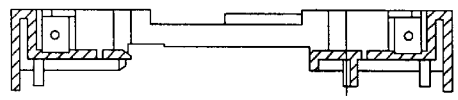
FIG. 10C

OPTICAL DISK LOADER

CROSS-REFERENCE TO RELATED APPLICATION

This application claims the priority benefit of Taiwan application Ser. No. 88105361, filed Apr. 3, 1999, the full disclosure of which is incorporated herein by reference.

BACKGROUND OF THE INVENTION

1. Field of Invention

The present invention relates to an optical disk loader. More particularly, the present invention relates to an optical disk loader capable of uploading a bare disk or a disk cartridge in a horizontal or a vertical position.

2. Description of the Related Art

Following the rapid progress in computer technologies and multimedia systems, the use of high-density optical disk to store audiovisual signals is a commonplace phenomenon.

At present, optical disk readers that are capable of loading and reading an optical disk in a vertical position are quite common in the market place. However, no optical disk reader that can accommodate a bare disk or a disk cartridge is capable of being positioned horizontally or vertically. Perhaps this is because the specification for a disk cartridge has been laid down according to an agreement between Matsushita and some ten other major Japanese companies. The DVD specifications for rewritable disk (Part 1. Physical Specifications Version 1.0) has stipulated that the external dimensions of a cartridge should be 135.5×124.6×8 (units in mm). Hence, a major part of the optical disk reader is occupied by the cartridge. This leads to some difficulties in designing (an optical disk reader that can accommodate both a bare disk and a disk cartridge. Furthermore, a conventional disk loader does not have a special device for restricting a disk when the optical disk reader is positioned vertically. In addition, if the tray for carrying the disk is unable to raise the optical disk on entering the player, the lower side of the disk may contact the driving motor. This may easily produce damaging scratches on the optical disk.

In light of the foregoing, there is a need to provide a better optical disk loader.

SUMMARY OF THE INVENTION

Accordingly, the purpose of the present invention is to provide a disk loader for a disk reader capable of loading a bare disk or a disk cartridge and that has special structure for restricting the disk even if the disk reader is positioned vertically.

Another aspect of this invention is to provide a disk loader that has a movable loading tray. When a disk is placed on the loading tray and then pushed into the disk reader, the loading tray has a mechanism for uplifting the disk in such a way that scratching due to contact with the driving motor is prevented.

One further aspect of this invention is to provide a disk loader for a disk reader capable of loading a bare disk or a disk cartridge, no matter if the player is positioned horizontally or vertically.

To achieve these and other advantages and in accordance with the purpose of the invention, as embodied and broadly described herein, the invention provides a disk loader for a disk reader. The disk loader includes a lower tray having a front edge, a back edge, a first side, a second side and a bottom panel. There are two sliding grooves at two ends on the bottom panel next to the respective first and second side in the neighborhood of the back edge. The front edge, back edge, first side and the second side together form an enclosed region. The disk loader further includes an upper tray having, a front edge and a back edge. The front edge of the upper tray is movable with respect to the front edge of the lower tray. Furthermore, each side of the back edge has a protruding pin. In addition, there is a pair of retractable blocks positioned on the sliding grooves of the lower tray with each block having an elastic element coupled to the back edged of the lower tray. Each retractable block has a slot that couples to the protruding, pin at the back edge of the upper tray. Finally, the loader also includes a vertical protective panel having a first face and a second face. The first face of the protection plate is coupled to the upper side of the bottom panel employing a turning mechanism in the neighborhood of the first or the second side of the lower tray. The second face of the protection plate is able to latch onto the upper tray by rotation. The retractable blocks and the erected protection plate are components for securing a disk cartridge or a bare disk in place during a disk-loading operation.

According to a second embodiment of the invention, a disk loader for a disk reader is provided. The disk loader includes a loading tray body, a first pre-loading arm and a second pre-loading arm. The tray body has a front edge, a back edge, a first side, a second side and a disk carrier base. The first pre-loading arm has a first end and a second end. The first end of the first pre-loading arm is coupled to one side at the back edge of the loading tray body via a first elastic element. Similarly, the second pre-loading arm also has a first end and a second end. The first end of the second pre-loading arm is coupled to other side of the back edge via a second elastic element. In addition, the disk loader further includes a rotary pre-loading arm having a first end and a second end. The first end of the rotary arm and a third elastic element are coupled to the first side near the front edge of the loading tray. The rotary arm is used for restricting a disk in position.

Through the action of both the first pre-loading arm and the second pre-loading arm, a disk cartridge is (ripped firmly no matter whether the disk reader is placed in a vertical or a horizontal position. Furthermore, the two pre-loading arms together with the third rotary pre-loading arm is able to grip a bare disk firmly no matter if the disk reader is positioned vertically or horizontally.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 7A, 7B and 7C are the respective schematic top, side and front views showing a disk loader having a bare disk on the loading tray of a vertically placed disk reader according to a first preferred embodiment of this invention;

FIGS. 8A, 8B and 8C are the respective schematic top, side and front views of a disk loader showing the process of loading a bare disk into a vertically placed disk reader according to the first embodiment of this invention;

FIG. 10A is a schematic top view showing a disk loader according to a second preferred embodiment of this invention;

FIGS. 10B, 10C, 10D and 10E are the respective schematic cross section views of the lines I—I, II—II, III—III, and IV—IV of FIG. 10A;

DESCRIPTION OF THE PREFERRED EMBODIMENTS

Figures 1A, 1B:
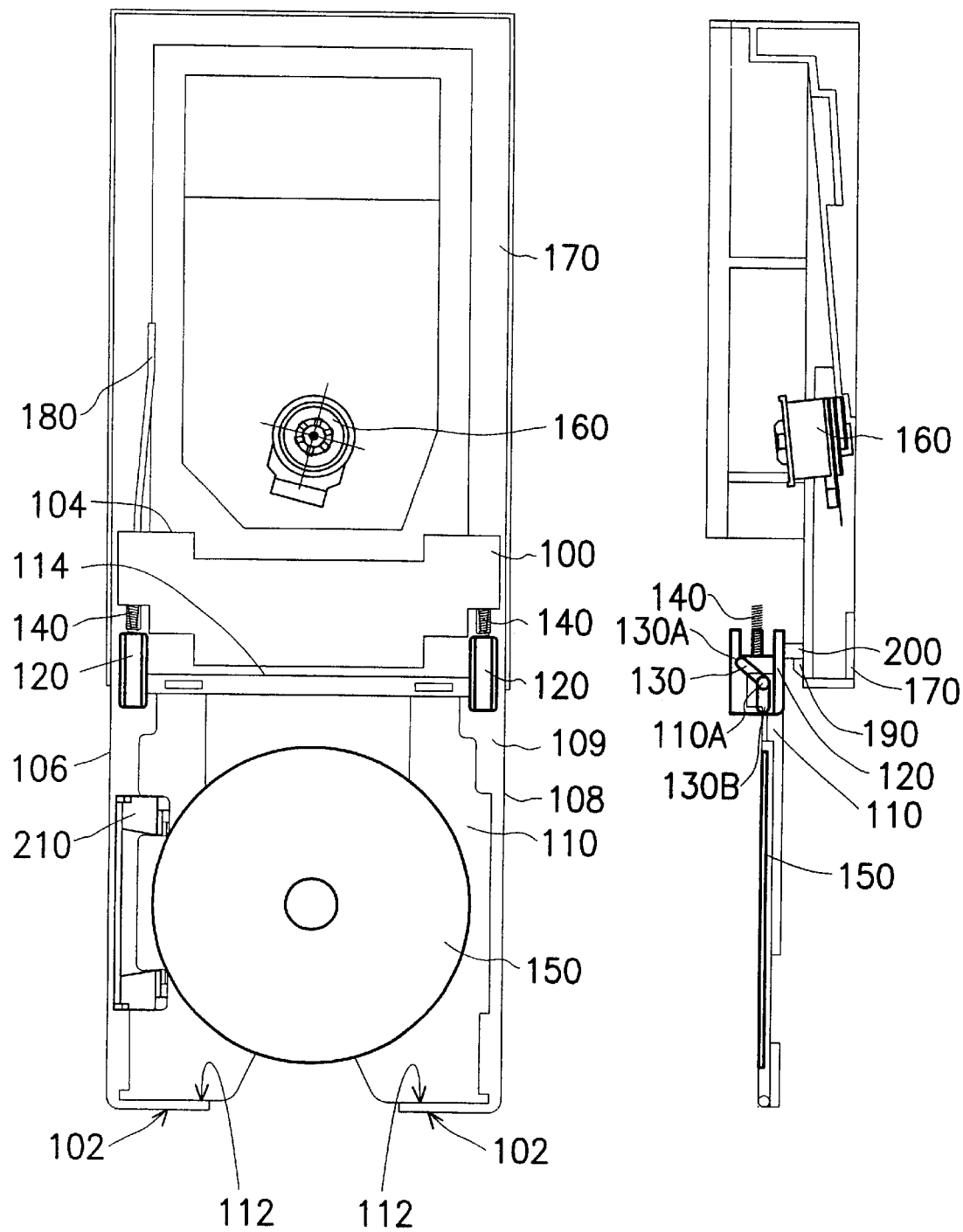
FIGS. 1A and 1B are the schematic top and side views showing a disk loader having a bare disk on the loading tray of a horizontally placed disk reader according to a first preferred embodiment of this invention.

Reference will now be made in detail to the present preferred embodiments of the invention examples of which are illustrated in the accompanying drawings. Wherever possible, the same reference numbers are used in the drawings and the description to refer to the same or like parts.

The invention provides a disk loader suitable for loading a bare disk or a disk cartridge into a horizontally placed or a vertically placed optical disk reader.

FIGS. 1A and 1B are the schematic top and side views showing a disk loader having a bare disk on the loading tray of a horizontally placed disk reader according to a first preferred embodiment of this invention. The disk loader includes a loading tray module having a lower tray 100 and an upper tray 110.

The lower tray 100 has a front edge 102, a back edge 104, a first side 106, a second side 108 and a bottom panel 109. There are two sliding grooves above the bottom panel 109 near the first side 106 and the other near the second side 108 in the neighborhood of the back edge 104. The front edge 102 the back edge 104 the first side 106. the second side 108 together form an enclosed region, preferably a rectangular area. The upper tray 110 includes a front edge 112 and a back edge 114. The front edge 112 of the upper tray 100 and the front edge 102 of the lower tray 100 are coupled in such a way that they can move relative to each other. At each end of the back edge 114 of the upper tray 110, there is a protruding pin 110A. Both the lower tray 100 and the upper tray 110 can be made by injection molding using plastic for example.

The main characteristics of this invention includes the introduction of a pair of retractable blocks 120 and a vertical protection panel 210 that are used for restricting a disk cartridge and a bare disk, respectively.

The pair of retractable blocks 120 are located above the sliding grooves of the lower tray 100 and are coupled to the back edge 104 of the lower tray 100 via an extensible element such as a compression spring 140. Using the compression spring 140, the retractable block 120 can slide relative to the sliding groove. When a disk cartridge is placed into the upper tray 110, one side of the cartridge pushes against the retractable blocks 120 and slides in the direction of the back edge 104 of the lower tray 100. Utilizing, the restorative force of the compression spring 140, the cartridge is prevented from sliding and dislodging.

Each of the pair of retractable blocks 120 further comprises a slot 130. The slot 130 is can be divided into two separate sections. The slot 130 includes a sloping section having the end 130A nearest to the back edge 104 higher up and a horizontal section from the bottom end of the sloping section to the end 130B. Furthermore, the pair of the retractable blocks 120 is coupled to protruding pins 110A on each side of the back edge 114. Therefore, the upper tray 110 and the lower tray 110 fit together or are separated to each other only by a small angle. The retractable blocks 120 can be made by injection molding or similar methods using plastic material.

The vertical protective panel 210 (refer to FIG. 7A) attached either to the first side 106 or the second side 108 mainly includes an L-shaped first face 212 and an L-shaped second face 214. The first face 212 can be coupled to the bottom panel 109 of the lower tray 100 through a rotary action. Furthermore, the second face 214 can latch onto the upper tray 110 through the rotary action.

When a disk is loaded into the upper tray 110 of a disk reader placed in a vertical position, the second face 214 of the vertical protective panel 210 is capable of restricting the disk. Hence, a disk coming off from the tray during a disk loading operation can be prevented. To avoid damaging the disk surface through scratching, the protection plate 210 is preferably made of plastic or similar types of materials. In addition, the protection plate can be formed by injection molding or other similar processes.

As shown in FIGS. 1A and 1B, when the tray module 100 and 110 are still outside the disk reader, a latching hook 200 just underneath the retractable block hooks onto a protruding block 190 above a carrier base 170. Hence, the protruding pin 110A of the upper tray 110 is able to move forward along the slot 130 so that the upper tray 110 and the lower tray 110 can stick together. The disk 150 is then placed over the upper tray 110.

Figures 2A, 2B:
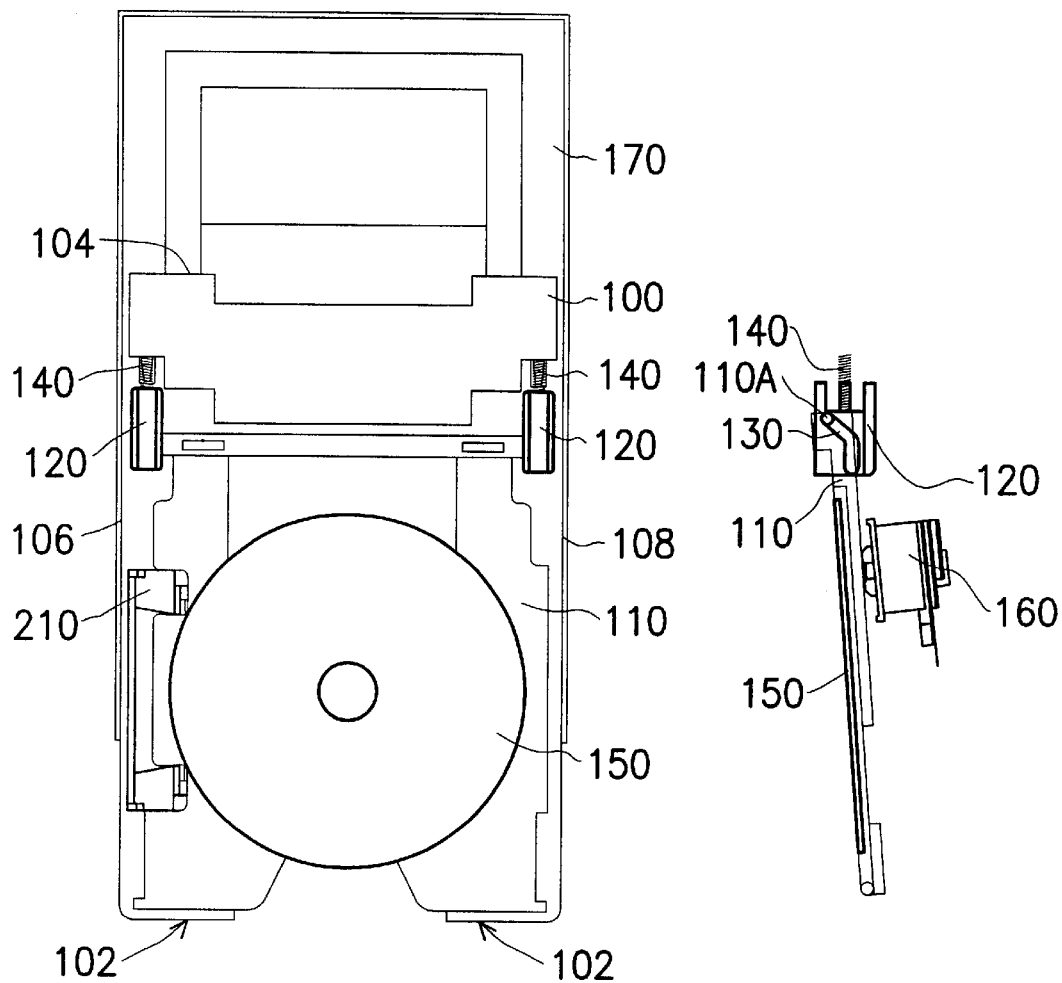
FIGS. 2A and 2B are the schematic top and side views of a disk loader showing the process of loading a bare disk into a horizontally placed disk reader according to the first embodiment of this invention.
Figures 3A, 3B:
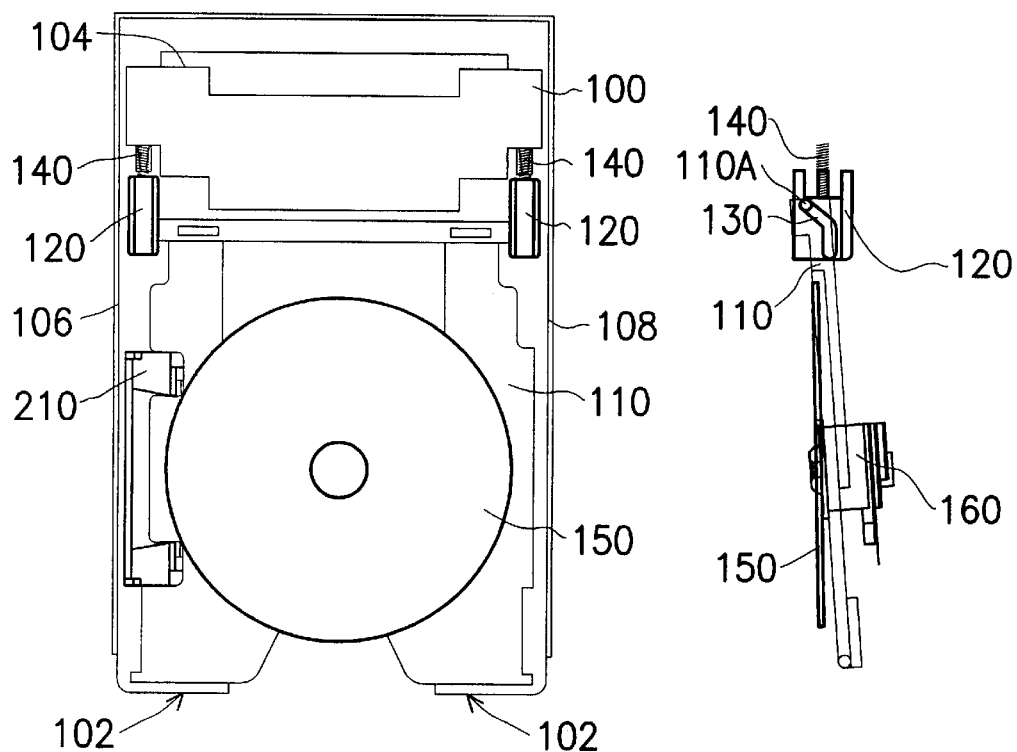
FIGS. 3A and 3B are the schematic top and side views of a disk loader having completed the process of loading a bare disk into a horizontally placed disk reader according to the first embodiment of this invention.

FIGS. 2A and 2B are the schematic top and side views of a disk loader showing the process of loading a bare disk into a horizontally placed disk reader according to the first embodiment of this invention. As the upper tray 110 and the lower tray 100 are pushed into the disk reader, the spring 140 pushes against the retractable blocks 120. Therefore, the protruding pin 110A of the upper tray 110 is forced backward, rising up the sloping section of the slot 130. Consequently, the disk 150 rises above the main axle of the driving motor 160. FIGS. 3A and 3B are the schematic top and side view of a disk loader having completed the process of loading a bare disk into a horizontally placed disk reader according to the first embodiment of this invention.

Figures 4A, 4B:
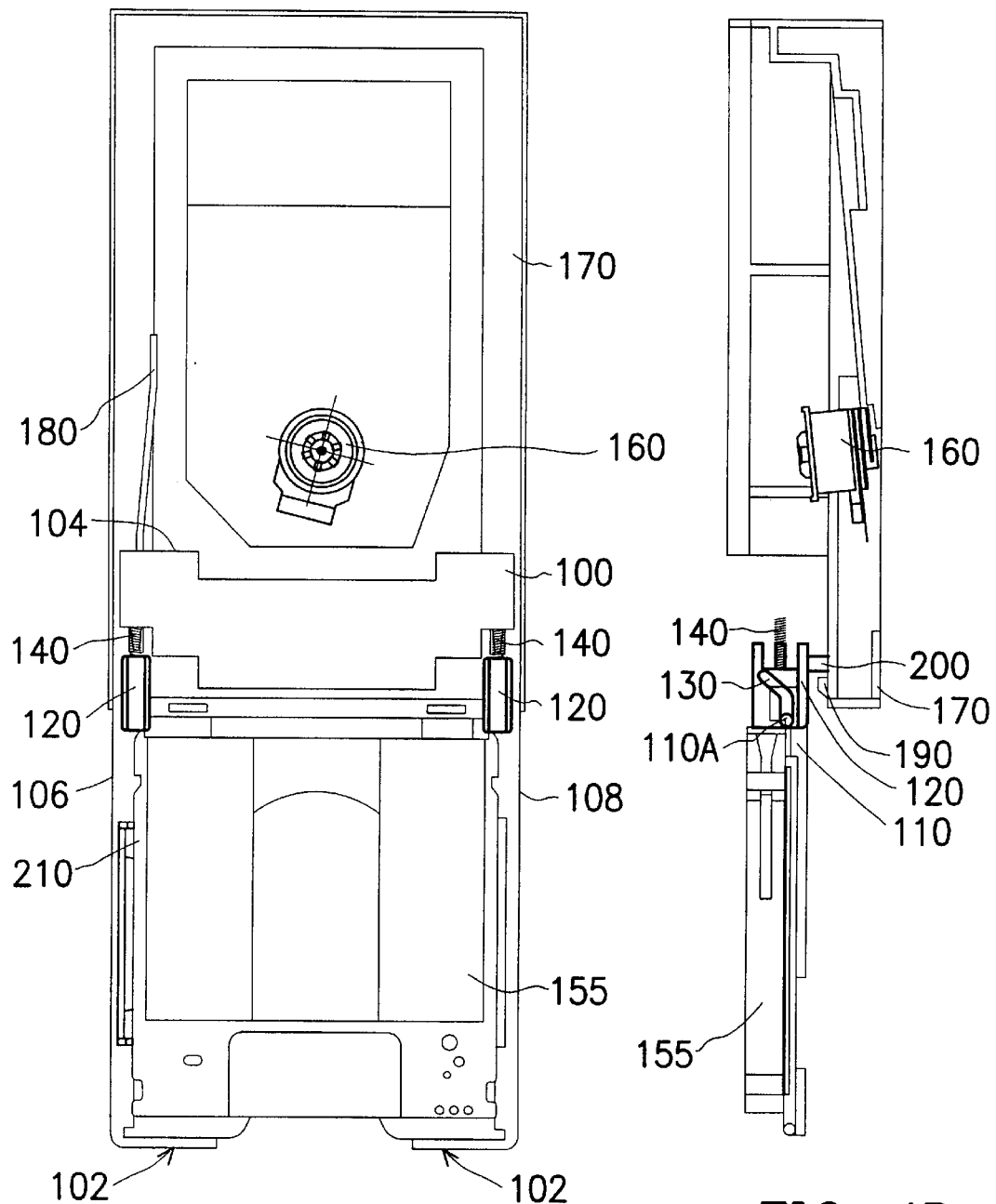
FIGS. 4A and 4B are the schematic top and side views showing a disk loader having a disk cartridge on the loading tray of a horizontally placed disk reader according to the first preferred embodiment of this invention.

FIGS. 4A and 4B are the schematic top and side views showing a disk loader having a disk cartridge on the loading tray of a horizontally placed disk reader according to the first preferred embodiment of this invention. As shown in FIG. 4A, the tray module including the upper tray 110 and the lower tray 100 are still outside the disk reader. As the retractable blocks are pushed by a cartridge 155, the retractable blocks moves inward a certain distance. The distance traveled by the spring 140 provides sufficient pressure for restricting the cartridge 155 firmly inside the tray so that no gaps are formed and free movement of the disk inside the loading tray is prevented.

Figures 5A, 5B:
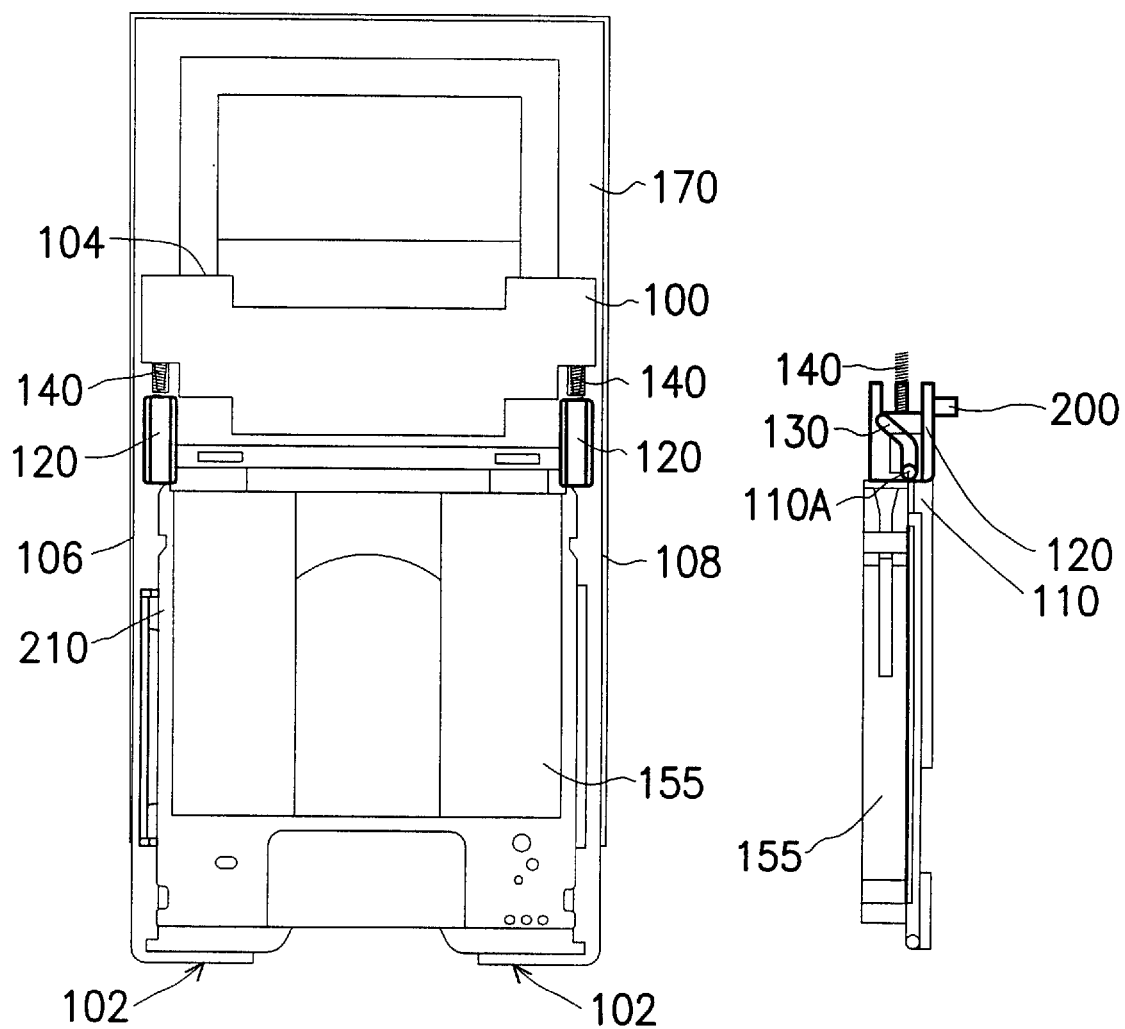
FIGS. 5A and 5B are the schematic top and side views of a disk loader showing the process of loading a disk cartridge into a horizontally placed disk reader according to the first embodiment of this invention.
Figures 6A, 6B:
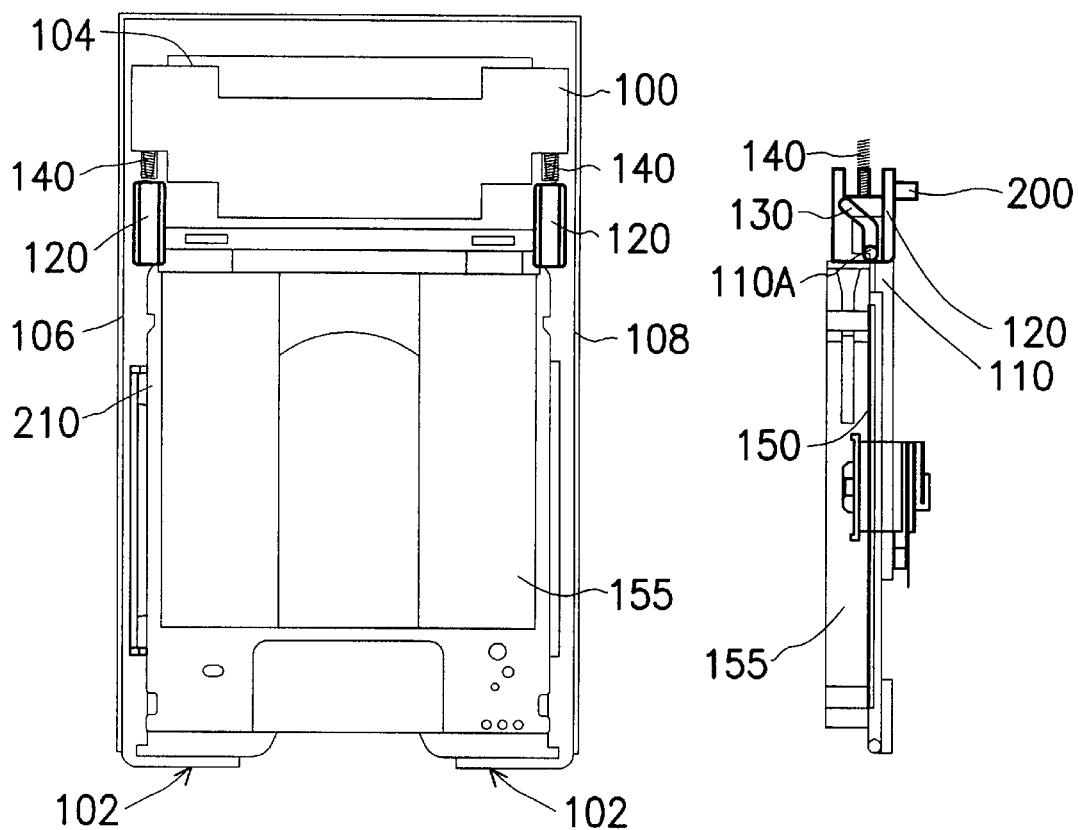
FIGS. 6A and 6B are the schematic top and side views of a disk loader having completed the process of loading a disk cartridge into a horizontally placed disk reader according to the first embodiment of this invention.

FIGS. 5A and 5B are the schematic top and side views of a disk loader showing the process of loading a disk cartridge into a horizontally placed disk reader according to the first embodiment of this invention. As the upper tray 110 and the lower tray 100 are pushed into the disk reader the retractable blocks 120 are restrained by cartridge 155 so that the spring 140 cannot push it out. Therefore the upper tray 110 does not rise. Since the lower part of the cartridge 155 is still higher than the uppermost part of the motor axle, there is no interference from the driving motor 160. FIGS. 6A and 6B are the schematic top and side views of a disk loader having completed the process of loading a disk cartridge into a horizontally placed disk reader according to the first embodiment of this invention. Finally, as shown in FIG. 6B, the disk reading module (including the main axle of the driving motor) rises, thereby achieving the necessary cartridge loading function.

FIGS. 7A, 7B and 7C are the respective top view, side view and front view showing, a disk loader having a bare disk on the loading tray of a vertically placed disk reader according to a first preferred embodiment of this invention. When the tipper tray 110 and the lower tray 100 are still outside the disk reader, the vertical protective panel 210 is flipped open to permit the entrance of the disk 150. On releasing the plate 210. the torsional spring 220 automatically returns the protection plate 210 to the tipper tray 110. Hence, the bare disk 150 is firmly gripped between the surfaces of the upper tray 110 and the vertical protective panel 210. Utilizing the torsional force of the spring 220, not only is the bare disk 150 firmly attached to the upper tray, but the disk dropping out of the loading tray is prevented as well. Since the protection plate 210 only contacts the peripheral region of the disk 150, main storage area is free from any possible scratches.

FIGS. 8A, 8B and 8C are the respective top view, side view and front view of a disk loader showing the process of loading a bare disk into a vertically placed disk reader according to the first embodiment of this invention. As the upper tray 110 and the lower tray 100 are pushed into the disk reader the spring 140 pushes against the retractable blocks 120. Therefore, the protruding pin 111A of the upper tray 110 is forced backward, rising along the sloping section of the slot 130. Consequently, the disk 150 rises above the main axle of the driving motor 160. In the meantime, the protruding portion of the protection plate 210 is gradually raised while sliding along the track on the carrier base. The interior edge of the plate 210 is capable of supporting the disk 150 so that the central hole in the middle of the disk 150 can match with the main axle of the driving motor 160.

Figure 9A:
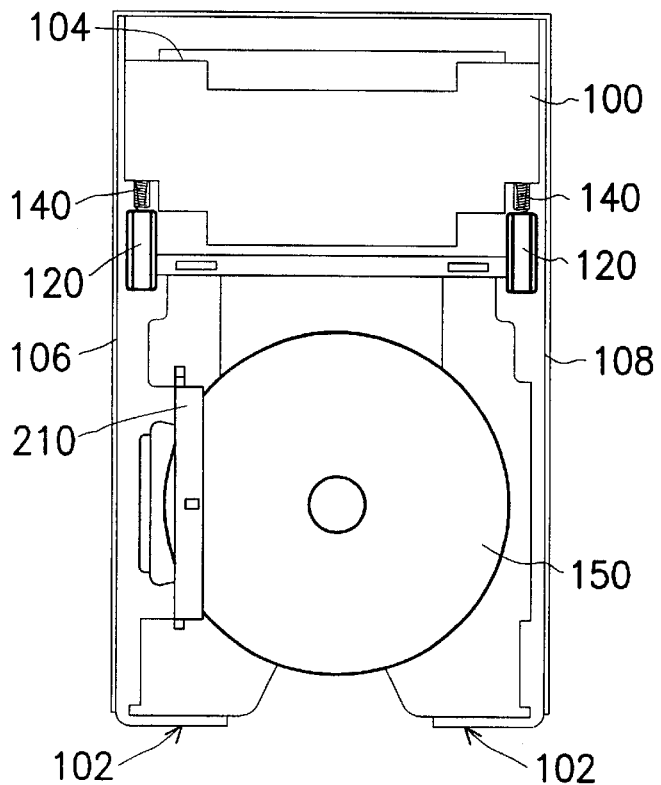
FIGS. 9A, 9B and 9C are the respective schematic top, side and front views of a disk loader having completed the process of loading a bare disk into a vertically placed disk reader according to the first embodiment of this invention.
Figure 9B:
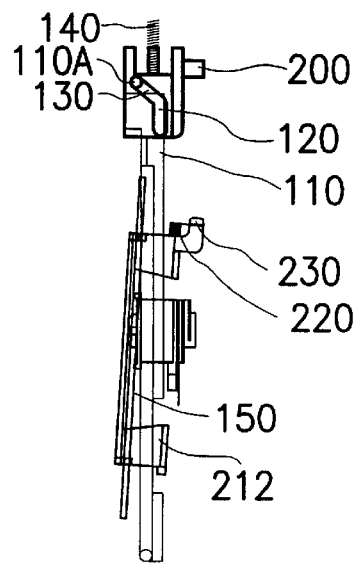
Figure 9C:
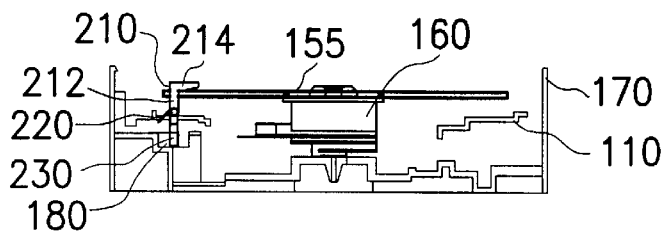

FIGS. 9A, 9B and 9C are the respective schematic top, side and front views of a disk loader having completed the process of loading a bare disk into a vertically placed disk reader according to the first embodiment of this invention. Finally, as shown in FIG. 9C, the disk reading module (including the main axle of the driving motor) rises, thereby raising the disk 150 off the loading tray. Since the protection plate 210 is pushed to its highest position, it does not interfere with the usual operation of a disk. Later, as the trays 110 and 100 move out, the protection plate 210 lowers gradually and the disk 150 again rests on the loading trays as shown in FIG. 7C.

The last condition to he considered is the loading of a disk cartridge into a disk reader that is placed vertically. However, this is similar to the loading a disk cartridge onto a horizontally placed disk reader. Under such condition, when the cartridge 155 is placed on the upper tray 110, there is no need to flip open the vertical protective panel 210. Pressure exerted by the spring 140 on the cartridge 155 is sufficient to prevent the cartridge 155 dislocating from the tray.

In summary, the disk loader according to first embodiment of this invention allows a bare disk or a disk cartridge to be firmly attached to a loading tray and then safely loaded into a disk reader, no matter if it is horizontally or vertically placed. In addition, the disk loader can be used for loading any kind of disks including CDs and DVDs.

In a second embodiment of this invention, another similar disk loader is provided. This disk loader is suitable for loading optical disks into both horizontally and vertically placed disk reader, and the optical disk that the disk reader can handle include bare disks or disk cartridges.

FIG. 10A is a schematic top view showing a disk loader 300 according to the second preferred embodiment of this invention. The disk loader 300 includes a loading tray body 309, a first pre-loading arm 314 and a second pre-loading arm 318. The tray body has a front edge 304, a back edge 306, a first side 308, a second side 310 and a disk carrier base 312. The first pre-loading arm 314 has a first end 314a and a second end 314b. The first end 314a of the first pre-loading arm 314 is coupled to one end 306a of the back edge 306 via a first elastic element 316. Similarly, the second pre-loading, arm 318 also has a first end 318a and a second end 318b. The first end 318a of the second pre-loading arm 318 is coupled to another end 306b of the back edge 306 via a second elastic element 320. In addition, the disk loader 300 further includes a rotary pre-loading arm 322 having a first end 322a and a second end 322b. The first end 322a of the rotary arm 322 and a third elastic element 324 are coupled to the first side 308 near the front edge 304 of the loading tray 302. The first and second pre-loading arms 314, 318 and the rotary arm 322 is used for restricting a disk in position.

The front edge 304, the back edge 306, the first side 308, the second side 310 and the disk carrier base 312 can be formed by injection molding using plastic or similar types of material. The loading tray body 302 is also preferably formed by injection molding. In addition, the first pre-loading arm 314, the second pre-loading arm 318 and the rotary pre-loading arm 322 can all be made from plastic material. The first elastic element 316 and the second elastic element 320 can be compression springs and the third elastic element 324 can be a torsional spring or a spring plate. A pair of bumps 326 on the front edge 304 of the loading tray body 302, and the position and relative distance of the pair of bumps 326 are identical to the position and relative distance of indentations on a disc cartridge, thereby when the cartridge is loaded, the pair of the bumps 326 seize the indentations on the disc cartridge.

FIGS. 10B, 10C, 10D and 10E are the respective schematic cross section views of the lines I—I, II—II, III—III, and IV—IV of FIG. 10A. From these cross section views, the detail cross structure can be viewed.

Figure 11A:
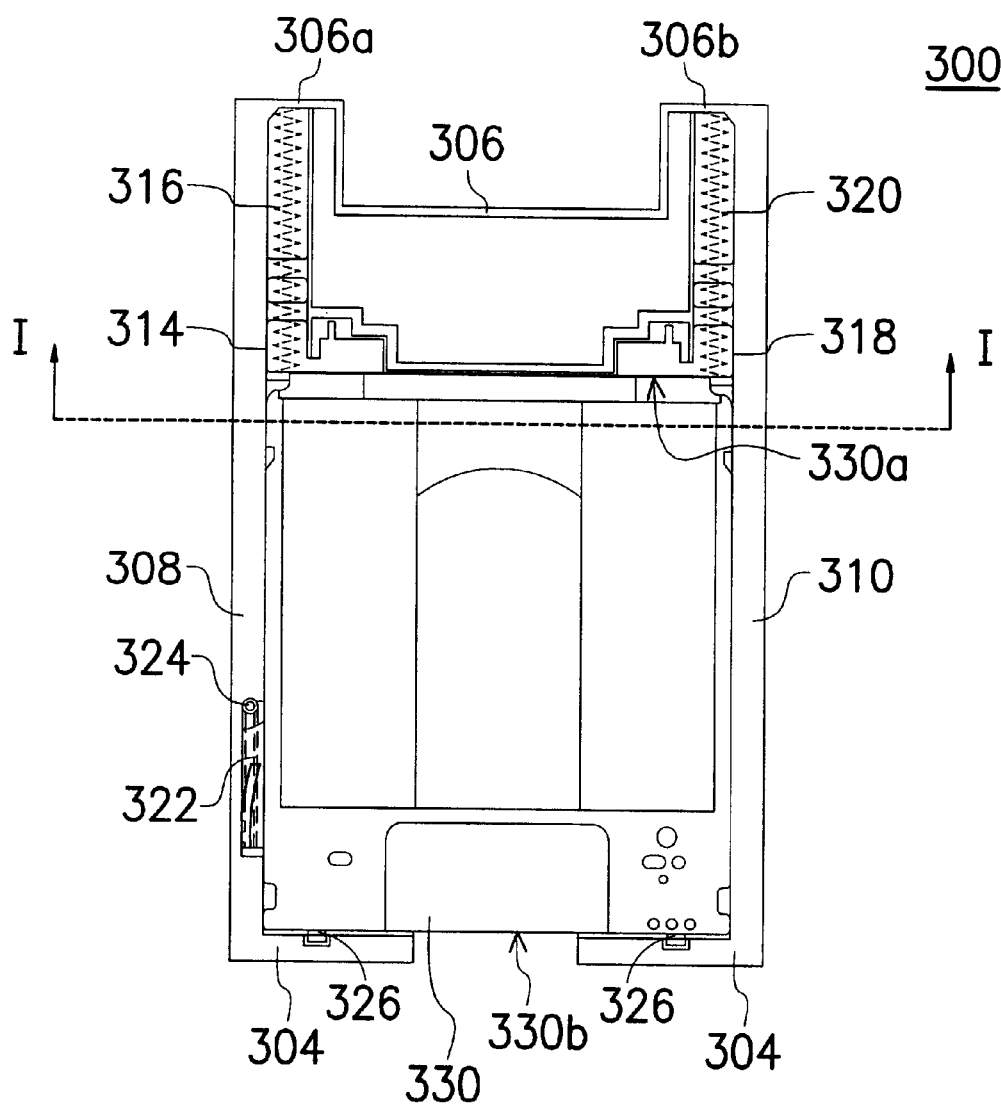
FIG. 11A is a schematic top view showing a disk cartridge inside the disk loader according to the second embodiment of this invention.
Figure 11B:
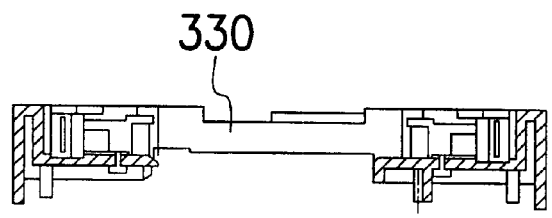
FIG. 11B is a schematic cross section view of the line I—I of FIG. 11A.

FIG. 11A is a schematic top view showing a disk cartridge inside the disk loader according to the second embodiment of this invention. FIG. 11B is a schematic cross section view of the line I—I of FIG. 11A.

When a disk cartridge 330 is placed on the disk carrier base 312 of the loading tray body 302 (refer to FIG. 10A) one side 330a of the cartridge 330 presses against the first pre-loading arm 314 and the second pre-loading arm 318, respectively. As the first and the second arms 314 and 318 move in, the first elastic element 316 and the second elastic element 320 are compressed. Hence, a restorative force is generated by the elastic elements 316 and 320. When the cartridge 330 rests completely on the loading tray body 302, the back edge 330a of the cartridge 330 returns back on the two pre-loading arms 314 and 318 and the front edge 330b presses against the front edge of the loading tray body 302. Due to the restorative force generated by the elastic elements 316 and 320, the cartridge 330 rests firmly in place. Hence, even if the disk reader is placed in a vertical positions, the cartridge 330 cannot get loose and drop off during a cartridge loading operation.

Since the rotary pre-loading arm 322 is not used for loading a cartridge into the loading tray, it remains in the closed position.

Figure 12A:
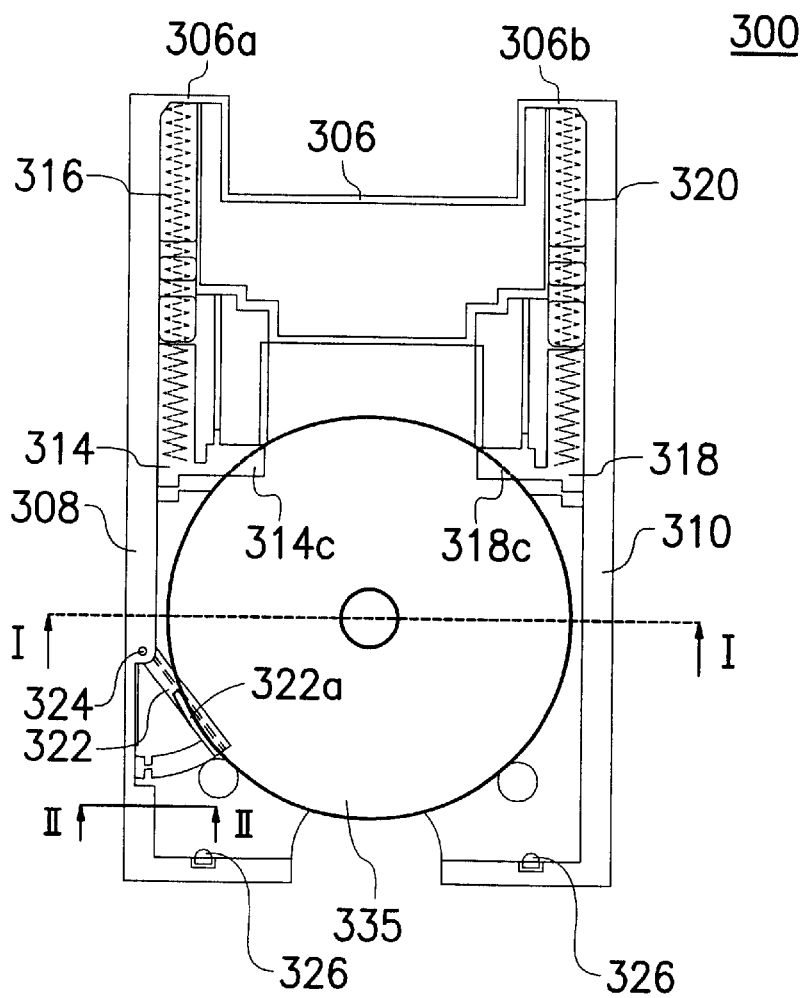
FIG. 12A is a schematic top view showing a bare disk inside the disk loader according to the second embodiment of this invention.
Figure 12B:
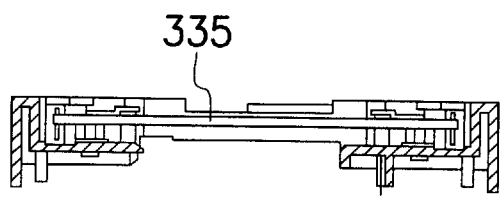
FIGS. 12B and 12C are the respective schematic cross section views of the lines I—I, II—II of FIG. 12A.
Figure 12C:
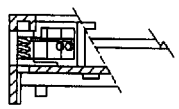

FIG. 12A is a schematic top view showing a bare disk 335 inside the disk loader according to the second embodiment of this invention. FIGS. 12B and 12C are the respective schematic cross section views of the lines I—I, II—II of FIG. 12A.

Figures 13A, 13B:
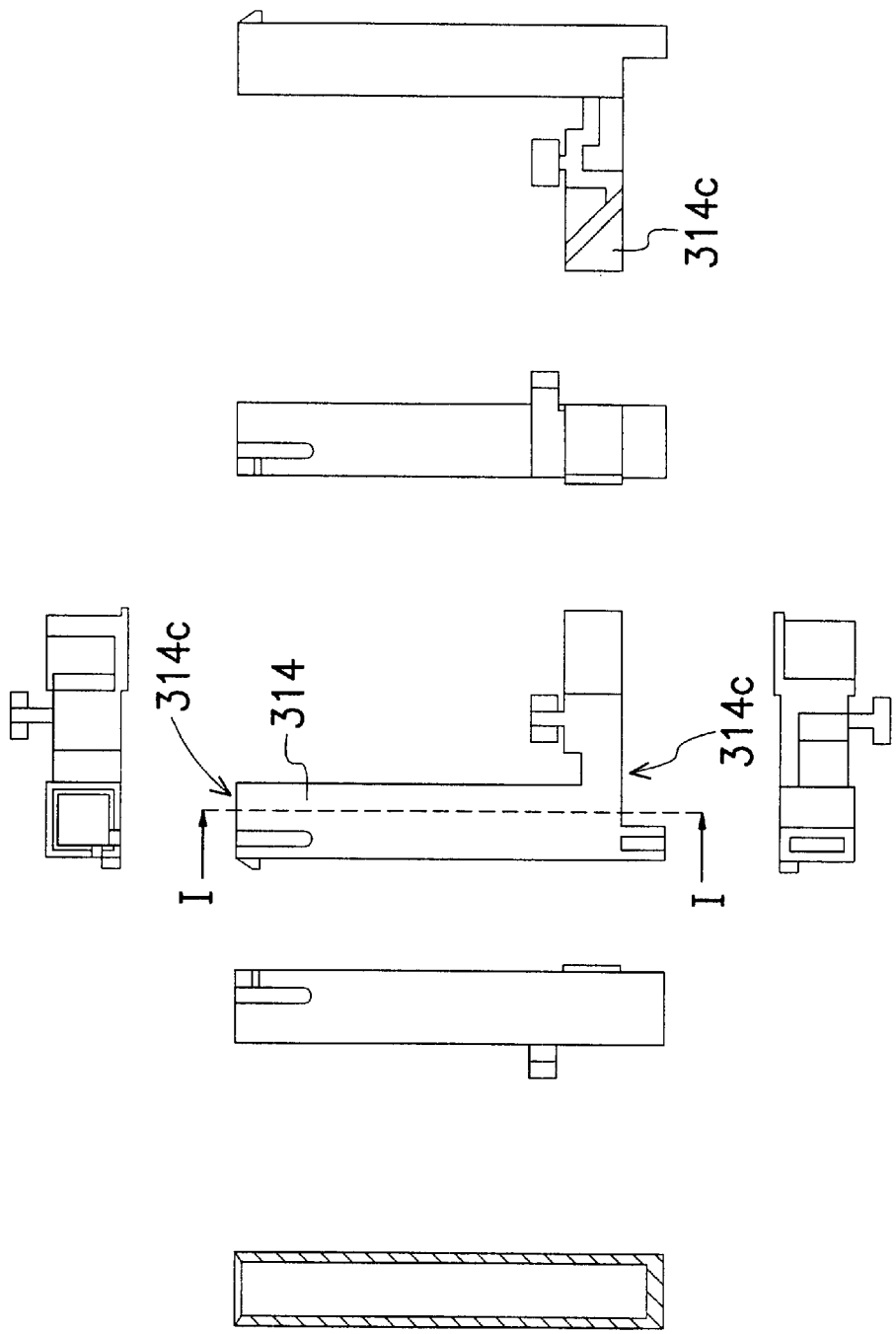
FIG. 13A is a schematic perspective views of the first pre-loading arm.
FIG. 13B is a schematic cross section view of line I—I of FIG. 13A.
Figures 14A, 14B:
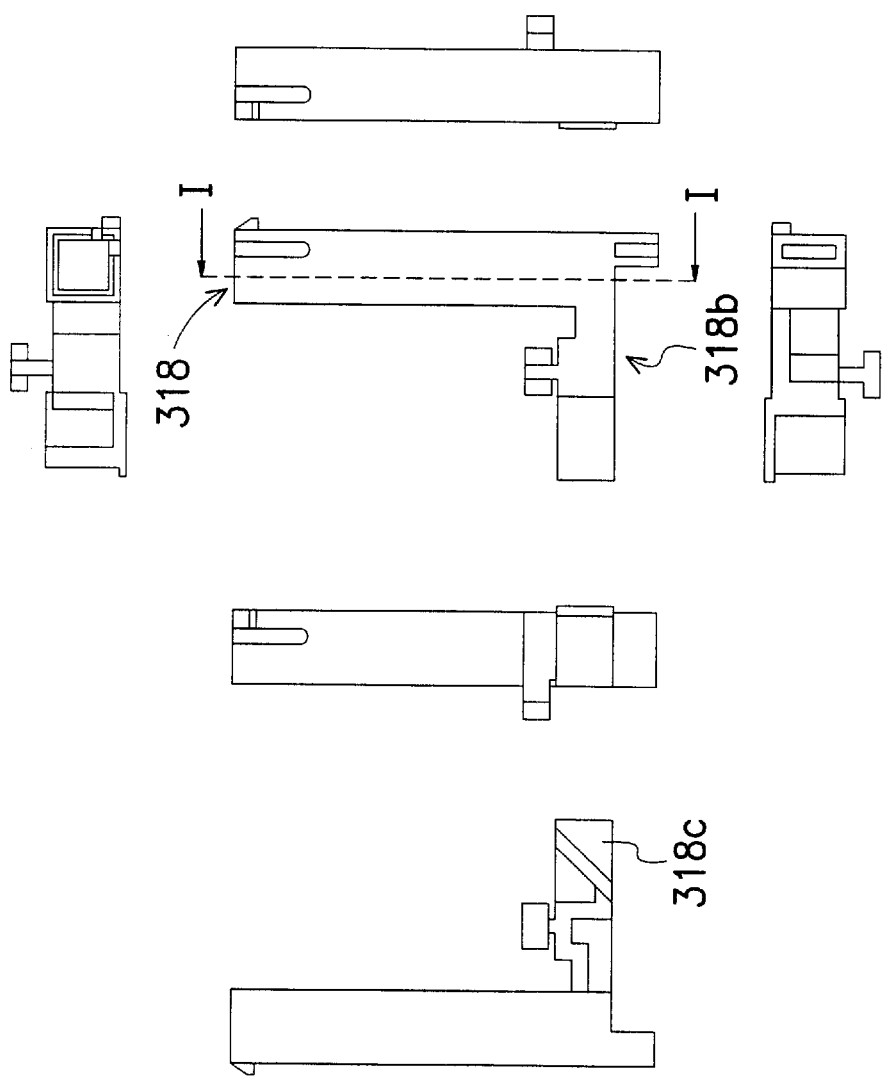
FIG. 14A is a schematic perspective views of the second pre-loading arm.
FIG. 14B is a schematic cross section view of line I—I of FIG. 14A.
Figure 15D:
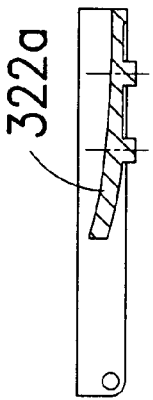
FIG. 15D is a schematic cross section view of the line I—I of FIG. 15C.
Figure 15A:
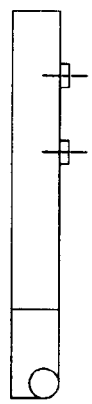
FIGS. 15A, 15B and 15C are the schematic perspective views of the rotary arm.
Figure 15B:
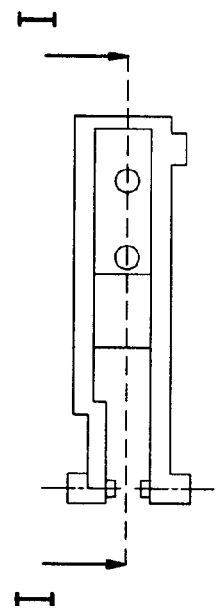
Figure 15C:
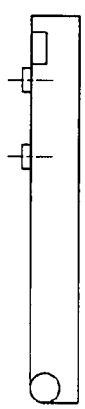

FIGS. 13A and 14A respectively show the perspective views of the first and second pre-load arms 314,318, which is an exemplary structure of pre-loading arms. The protruding slice 314c and 318c of the first and second pre-loading arm 314, 318 is perpendicular to the surface of a disk without cartridge. FIG. 13B and FIG. 14B respectively show the cross section views of the line I—I of the first and second pre-loading arms 314, 318 in FIGS. 13A and 14A. From FIG. 13B and FIG. 14B, hollows inside the first and second pre-loading arms are suitable for the first and second elastic element 316, 320 to be situated inside the hollows. FIGS. 15A, 15B and 15C are perspective views of the rotary arm 322, and FIG. 15D shows the cross section view of the line I—I of FIG. 15B. Referring to FIG. 15D, a protruding slice 322a is formed which is perpendicular the surface of a disc.

When a disk 335 is placed on the disk carrier base 312 of the loading tray body 302 (refer to FIG. 10A), the periphery of the disk 335 touches the first pre-loading arm 314 and the second pre-loading arm 318. Furthermore, the rotary pre-loading arm 322 can be opened to permit the entrance of the disk 335 into loading tray body 302. The third elastic element 324 provides the necessary pressure on the rotary pre-loading arm 322 to restrict the edge of the disk 335. Hence, when the disk loader 300 is positioned vertically, the disk 335 is supported by the first pre-loading arm 314, the second pre-loading arm 318 and the rotary pre-loading arm 322. Therefore, the disk 355 is restricted and hence is not so easily shaken off the loading tray when carrying the disk into the disk reader. The protruding slice 314c, 318c and 322a of the first and second pre-loading arm 314, 318 and rotary arm 322 restrict the moving range of the disc 335, by which the protruding slice 314c, 318c and 322a prevent the disc 335 from falling off.

In summary, the disk loader according to second embodiment of this invention allows a bare disk or a disk cartridge to be firmly attached to a loading tray and then safely loaded into a disk reader, no matter if it is horizontally or vertically placed. In addition the disk loader can be used for loading any kind of disks including CDs and DVDs.

In conclusion the disk loader of this invention has several characteristics. First, a retractable block structure capable of restricting a disk cartridge is attached to the loading tray so that the cartridge cannot fall off even if the disk reader is positioned vertically. Second, a vertical protective panel structure is introduced so that any bare disk call rest firmly on a loading tray while waiting to be loaded, even if the disk reader is positioned vertically. Third, whether the disk reader is vertically or horizontally placed, a smooth entrance of a disk into the disk reader is always ensured. Finally, the loading tray can have a composite structure comprised of an upper tray and a lower tray structure. Consequently, interference of a disk with the axle of the driving motor inside a disk reader can be prevented.

It is apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A disk loader for a disk reader, comprising:

a lower tray having a front edge, wherein a back edge, a first side, a second side and a bottom panel, there are two sliding grooves at two ends on the bottom panel next to the respective first and the second side in the neighborhood of the back edge, and the front edge, back edge, first side and the second side together form an enclosed region;

an upper tray having a front edge and a back edge, wherein the front edge of the upper tray is movable with respect to the front edge of the lower tray, and each side of the back edge furthermore has a protruding pin;

a pair of retractable blocks positioned on the sliding grooves of the lower tray with each block having an elastic element coupled to the back edged of the lower tray, wherein each retractable block has a slot that includes a sloping section having the end nearest to the back edge of the lower tray higher up and a horizontal section running from the bottom end of the slope toward the front, and a pair of protruding pins one each side at the back edge of the upper tray are coupled to the slot; and a vertical protective panel having a first face and a second face, wherein the first face of the protection plate is coupled to the upper side of the bottom panel employing a turning mechanism in the neighborhood of the first or the second side of the lower tray, and the second face of the protection plate is able to latch onto the upper tray by rotation.

2. The disk loader of claim 1, wherein the elastic element includes compression spring.

3. The disk loader of claim 1, wherein the slot in the retractable block has a wide-angled V-shape.

4. The disk loader of claim 1, wherein the retractable blocks are made from plastic material.

5. The disk loader of claim 1, wherein the retractable blocks are made by injection molding.

6. The disk loader of claim 1, wherein the vertical protective panel is made from plastic material.

7. The disk loader of claim 1, wherein both the first and the second face of the vertical protective panel have an L-shaped profile.

8. The disk loader of claim 1, wherein the vertical protective panel is made by injection molding.

9. The disk loader of claim 1, wherein the enclosed region is rectangular.

10. A disk loader for a disk reader comprising:
a loading tray having a front edge, a back edge, a first sides a second side and a bottom panel, wherein there are two sliding grooves at two ends on the bottom panel next to the respective first and the second side in the neighborhood of the back edge, and the front edge, back edge, first side and the second side together form an enclosed region;
a pair of retractable blocks positioned on the sliding grooves of the loading tray with each block having an elastic element coupled to the back edged of the loading tray; and
a vertical protective panel having a first face and a second face, wherein the first face of the protection plate is coupled to the upper side of the bottom panel and employs a turning mechanism in the neighborhood of the first or the second side of the loading tray, and the second face of the protection plate is able to latch onto the upper tray by rotation.

11. The disk loader of claim 10, wherein the elastic element includes a compression spring.

12. The disk loader of claim 10, wherein the slot in the retractable block has a wide-angled V-shape.

13. The disk loader of claim 10, wherein the retractable blocks are made from plastic material.

14. The disk loader of claim 10, wherein the retractable blocks are made by injection molding.

15. The disk loader of claim 10, wherein the vertical protective panel is made from plastic material.

16. The disk loader of claim 10, wherein both the first and the second face of the vertical protective panel have an L-shaped profile.

17. The disk loader of claim 10, wherein the vertical protective panel is made by injection molding.

18. The disk loader of claim 10, wherein the enclosed region is rectangular.

19. A disk loader for a disk reader, comprising:
a loading tray body having a front edge, a back edge, a first side, a second side and a disk carrier base;
a first pre-loading arm having a first end and a second end, wherein the first end is coupled to one side at the back edge of the loading tray body via a first elastic element, such that the first pre-loading arm is restricted to linearly slide to press, by the second end, the disk or disk cartridge to be loaded against the front edge of the loading tray body; and
a second pre-loading arm also having a first end and a second end, wherein the first end of the second pre-loading arm is coupled to the other side of the back edge of the loading tray via a second elastic element, such that the second pre-loading arm is restricted to linearly slide to press, by the second end, the disk or disk cartridge to be loaded against the front edge of the loading tray body.

20. The disk loader of claim 19, wherein the loader further includes a rotary pre-loading arm having a first end and a second end, the first end of the rotary arm and a third elastic element are coupled to the first side near the front edge of the loading tray for restricting, the movable range of a disk.

21. The disk loader of claim 19, further comprising protruding slices which are respectively perpendicular to the surfaces of the second ends of the first, the second pre-loading arms and the rotary arm to prevent a disk from eversion.

22. She disk loader of claim 19, further comprising a pair of bumps on the front edge of the loading tray body, and the position and relative distance of the pair of bumps are identical to the position and relative distance of indentations on a cartridge, thereby when the cartridge is loaded, the pair of the bumps seize the indentations on the cartridge.

23. The disk loader of claim 19, wherein the front edge, the back edge, the first side, the second side and the disk carrier base are formed together in a one piece.

24. The disk loader of claim 23, wherein the front edge, the back edge, the first side, the second side and the disk carrier base are made from plastic material.

25. The disk loader of claim 23, wherein the front edge, the back edge, the first side, the second side and the disk carrier base are made by injection molding.

26. The disk loader of claim 19, wherein the first pre-loading arm, the second pre-loading arm and the rotary pre-loading arm are all made from plastic material.

27. The disk loader of claim 19, wherein both the first elastic element and the second elastic element are compression springs.

28. The disk loader of claim 20, wherein the third elastic element is a torsional spring.

29. The disk loader of claim 20, wherein the third elastic element is a spring plate.

* * * * *